United States Patent
Hong et al.

(10) Patent No.: US 8,044,933 B2
(45) Date of Patent: Oct. 25, 2011

(54) METHOD AND DEVICE FOR CONTROLLING DISPLAY ACCORDING TO TILT OF MOBILE TERMINAL USING GEOMAGNETIC SENSOR

(75) Inventors: Nho-Kyung Hong, Seoul (KR); Sung-Jun Lee, Seoul (KR); June-Seok Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1455 days.

(21) Appl. No.: 11/513,785

(22) Filed: Aug. 31, 2006

(65) Prior Publication Data

US 2007/0046630 A1    Mar. 1, 2007

(30) Foreign Application Priority Data

Aug. 31, 2005 (KR) .................. 10-2005-0080863

(51) Int. Cl.
*G09G 5/08*      (2006.01)

(52) U.S. Cl. ....................... 345/158; 345/156

(58) Field of Classification Search .......... 345/158, 345/156

See application file for complete search history.

(56) References Cited

U.S. PATENT DOCUMENTS

| | | | | |
|---|---|---|---|---|
| 3,658,413 | A * | 4/1972 | Cornell ........................ | 40/720 |
| 6,903,874 | B1 * | 6/2005 | Karterman .................. | 359/626 |
| 2003/0060094 | A1 * | 3/2003 | Motsenbocker .............. | 440/6 |
| 2004/0252913 | A1 * | 12/2004 | Ahn ............................ | 382/296 |
| 2005/0146620 | A1 * | 7/2005 | Monroe et al. ............. | 348/208.2 |
| 2005/0200598 | A1 * | 9/2005 | Hayes et al. ................ | 345/156 |

* cited by examiner

*Primary Examiner* — Richard Hjerpe
*Assistant Examiner* — Leonid Shapiro
(74) *Attorney, Agent, or Firm* — The Farrell Law Firm, P.C.

(57) ABSTRACT

Disclosed are a method and a device for dynamically changing the display of a picture according to the degree of tilt of a mobile terminal without any separate key input. The degree of tilt refers to the angle at which the mobile terminal is tilted with respect to a reference plane, and the degree of tilt is calculated using a geomagnetic sensor.

15 Claims, 7 Drawing Sheets

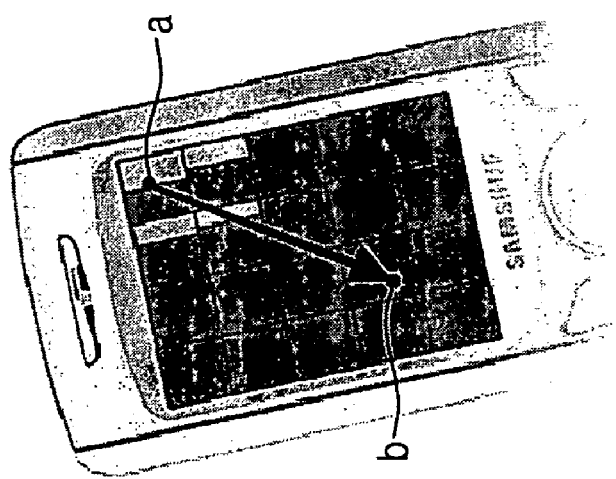
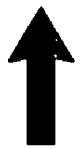
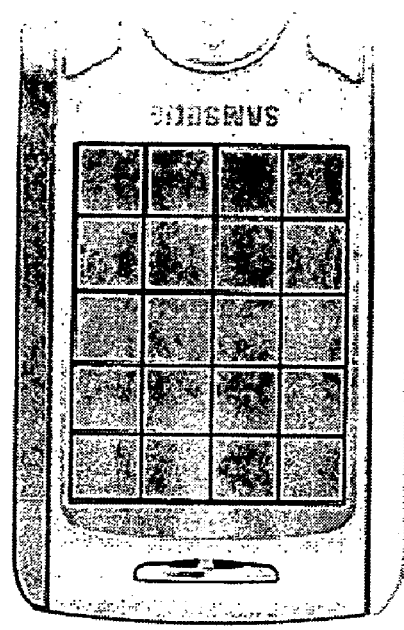
FIG.5A    FIG.5B

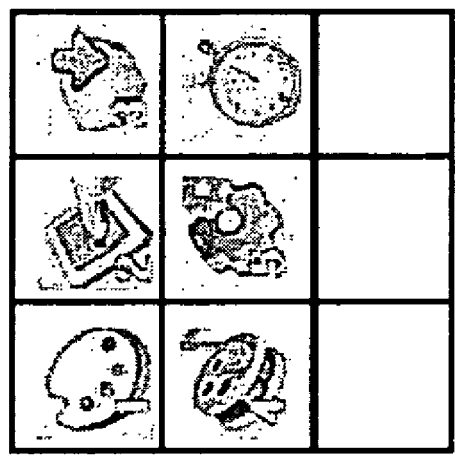
FIG.6A
TURN
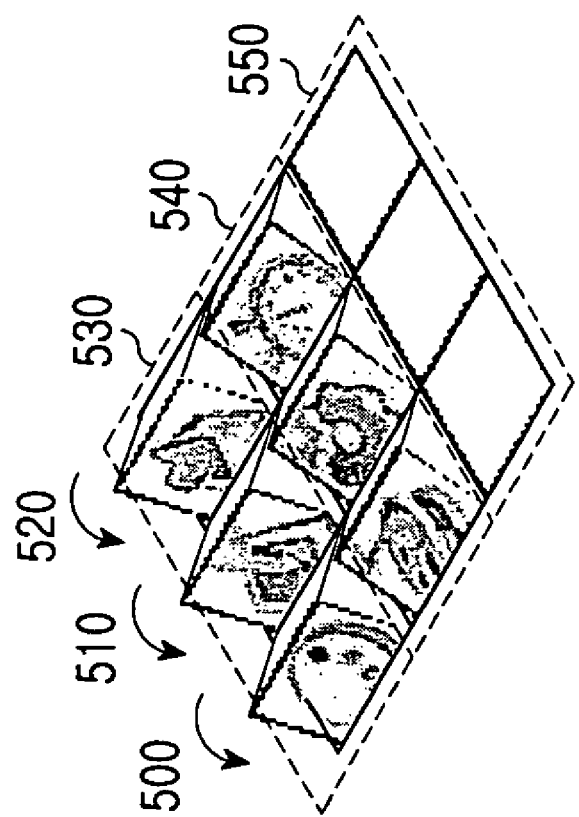
FIG.6B

METHOD AND DEVICE FOR CONTROLLING DISPLAY ACCORDING TO TILT OF MOBILE TERMINAL USING GEOMAGNETIC SENSOR

PRIORITY

This application claims priority to an application entitled "Method and Device for Controlling Display According to Tilt of Mobile Terminal Using Geomagnetic Sensor" filed with the Korean Intellectual Property Office on Aug. 31, 2005 and assigned Serial No. 2005-80863, the contents of which are incorporated herein by reference.

BACKGROUND OF THE INVENTION

1. Field of the Invention

The present invention relates to a mobile terminal capable of changing the display of a picture according to the degree of tilt thereof using a geomagnetic sensor, and more particularly to a method and device for controlling the display of a picture according to the degree of tilt of a mobile terminal using a geomagnetic sensor.

2. Description of the Related Art

With the increasing use of mobile terminals including personal communication system (PCS) and personal digital assistant (PDA) phones, various functions and services have become available for these devices. Mobile terminals have gone beyond merely being telephones and now integrate a variety of additional functions.

Additional functions included in mobile terminals have brought users greater convenience and efficiency. In relation to those functions, mobile terminals display operational states and various information on their display units. Also, mobile terminals can display fun character images in a standby mode or game images during implementation of a mobile game. Recently, mobile terminals with a swivel display unit can be turned, thus providing a wider display (horizontal mode) and have become popular. When needed, users can swivel the display unit to view an image or data on a wider screen.

However, conventional mobile terminals with a swivel display unit can only display an image in a direction turned according to the direction of the rotation of the display unit. In other words, conventional mobile terminals merely change the display direction of an image or a motion picture according to the direction of the rotation of the display unit, without physically changing the display at the overall tilt angle of the display unit.

SUMMARY OF THE INVENTION

Conventional mobile terminals change the display of an image only when the display unit is turned or when a key for changing the display direction is pressed. There is an increasing demand for the display of an image with a realistic and dynamic interaction according to the degree of tilt of the display unit.

The present invention has been made to solve the above-mentioned problems present in the prior art. One objective of the present invention is to provide a method for controlling the display of a picture according to the degree of tilt of a mobile terminal using a geomagnetic sensor and a mobile terminal capable of controlling the display of a picture using the method.

In accordance with one aspect of the present invention there is provided a mobile terminal capable of controlling the display of a picture according to the degree of tilt thereof using a geomagnetic sensor, which includes: a display unit for displaying an image formed by a collection of front faces of polyhedrons which turn three-dimensionally according to a tilt direction and angle of the mobile terminal; a sensor for detecting a movement of the display unit and calculating the tilt direction and angle of the mobile terminal; and a control unit for displaying dynamic changes of the front faces of the polyhedrons according to the tilt direction and angle data provided from the sensor and for turning the polyhedrons further in the tilt direction when the tilt angle exceeds a critical value, thereby displaying an image formed by new front faces of the polyhedrons.

The second aspect of the present invention, provides a method for controlling the display of a picture according to the degree of tilt of a mobile terminal using a geomagnetic sensor, which includes: displaying an image formed by a collection of front faces of polyhedrons; detecting a movement of the mobile terminal during the display of the image; calculating a tilt direction and angle of the mobile terminal when any movement is detected; and turning the front faces of the polyhedrons three-dimensionally in a direction and at an angle corresponding to the calculated tilt direction and angle to change the display of the image accordingly.

BRIEF DESCRIPTION OF THE DRAWINGS

The above and other objects, features and advantages of the present invention will be more apparent from the following detailed description taken in conjunction with the accompanying drawings, in which:

FIGS. 5A and B illustrate polyhedrons turning with the swivel of a display unit according to the present invention; and FIGS. 6A and 6B illustrate a general menu screen and the three dimensional turning of regular hexahedrons which display menu icon images, respectively, on the mobile terminal.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention unclear.

The present invention provides a method and device for dynamically changing the display of a picture according to the degree of tilt of a mobile terminal without any separate key input. The term "degree of tilt" refers to the angle at which the mobile terminal is tilted with respect to a reference plane. The degree of tilt is calculated using a geomagnetic sensor. According to the present invention, a three-dimensional (3D) engine is mounted in the display screen of the mobile terminal. The display screen is filled with regular hexahedrons, each bounded by six squares, corresponding to the screen resolution. However, only one face of each hexahedron is actually seen on the screen. A polyhedron, such as a hexahedron, is made up of polygons which form the faces of the polyhedron. Polyhedrons are the smallest units used in 3D-stereoscopic display of computer graphics.

When a user tilts a mobile terminal during the display of an image formed by front faces of a plurality of polyhedrons, the plurality of polyhedrons are turned in the same direction and at the same angle as the tilt of the mobile terminal. When the tilt angle exceeds a critical value, the polyhedrons are turned further in the same direction sequentially like dominoes so that new faces will appear as front faces of the polyhedrons on the display screen to form a new image. The geomagnetic sensor adopted in the present invention is a compass-like sensor for measuring the earth's magnetic field and detecting directions. Recently, micro geomagnetic sensors have been commercialized for use in mobile terminals. Such geomagnetic sensors enable an electronic compass function, azimuth determination and precise location-based services through a combination of location data received from a GPS and azimuth data. Since micro geomagnetic sensors which are a very small in size can be mounted in mobile terminals, there is a growing demand for the development of additional functions or services available in mobile terminals using those sensors.

In the present invention, a 3D engine is also mounted in a mobile terminal in order to measure the degree of tilt of the mobile terminal and dynamically generate a GUI (Graphic User Interface) reacting to the degree of tilt.

Figure 1:
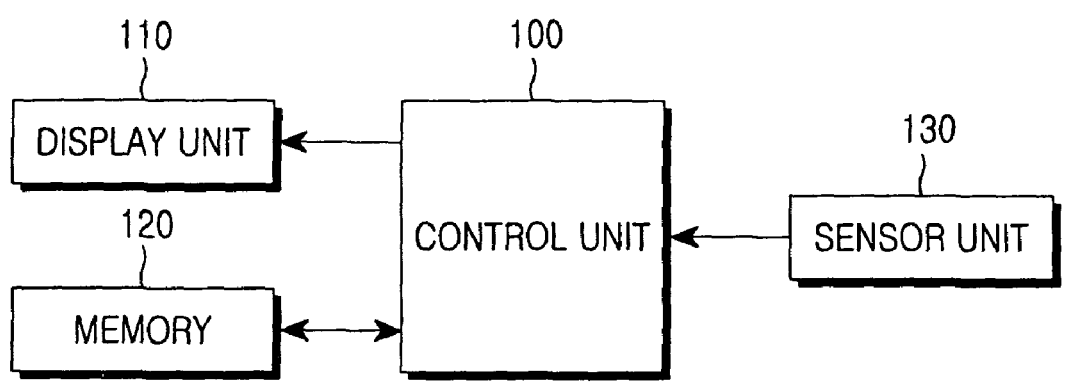
FIG. 1 is a block diagram of a mobile terminal according to the present invention.

The components and operations of the mobile terminal having the above functions will be explained in detail with reference to FIG. 1. FIG. 1 is a block diagram of the mobile terminal according to the present invention.

Referring to FIG. 1, the mobile terminal includes a control unit 100, a display unit 110, a memory 120 and a sensor unit 130.

The display unit 110 may comprise a display device such as an LCD (Liquid Crystal Display). According to the present invention, the display unit 100 includes polyhedrons which move three-dimensionally according to the direction and angle of tilt of the mobile terminal under the control of the control unit 100. Specifically, the display unit 110 displays an image formed by a collection of front faces (polygons) of polyhedrons (particularly, regular hexahedrons) which move three-dimensionally according to the direction and angle at which the mobile terminal is tilted with respect to a reference plane.

The polyhedrons (regular hexahedrons) are turned slightly when the user tilts the mobile terminal slightly. However, when the tilt degree exceeds a critical value, the polyhedrons are turned further in the same direction like dominoes falling sequentially so that new faces will appear as front faces of the polyhedrons on the display unit 110. Accordingly, an image corresponding to the new faces will be displayed on the display unit 110.

The memory 120 consists of a ROM (Read Only Memory) and a RAM (Random Access Memory) for storing a plurality of programs and data necessary to control operations of the mobile terminal. According to the present invention, the memory 120 also stores a 3D engine for generating dynamically changing virtual images.

The sensor unit 130 includes a geomagnetic sensor for detecting an angular movement using angular momentum in an inertial space around at least one axis orthogonal to a spin axis. When the user turns the display unit 110 from an upright direction to another direction (left, right or downward direction), the sensor unit 130 detects the degree of tilt of the display unit 110 calculates the direction and angle of tilt. Specifically, when a signal representing the turning of the mobile terminal in a horizontal or vertical direction is input from the geomagnetic sensor, the sensor unit 130 detects a reciprocating motion of the mobile terminal and calculates the degree of tilt, i.e. direction and angle of tilt, based on the detected reciprocating motion. Then the sensor unit 130 provides the control unit 100 with the calculation data. In summary, the sensor unit 130 detects a reciprocating motion of the display unit 110 to a left, right or downward direction from an upright direction, calculates the degree of tilt of the display unit 110 and provides the calculated tilt degree to the control unit 100.

The control unit 100 controls overall operations of the mobile terminal. Particularly, the control unit 100 controls the display unit 110 to output an image dynamically changing with the degree of tilt according to the present invention. In this connection, the control unit 100 detects movement of the mobile terminal and calculates the degree of tilt of the display unit 110. In other words, the control unit 100 calculates the degree of tilt, i.e. the direction and angle of tilt of the mobile terminal, according to a signal generated from the sensor unit 130. Then the control unit 100 produces an image corresponding to the calculated degree of tilt to be displayed on the display unit 110 and keeps updating the image during the movement of the mobile terminal. The control unit 100 displays changes of polyhedrons which turn according to the tilt direction and angle provided by the sensor unit 130. When the tilt angle exceeds a critical value, the control unit 100 turns the polyhedrons in the same direction as the tilt so that a new image formed by another faces of the polyhedrons will be displayed on the display unit 110.

Figure 2:
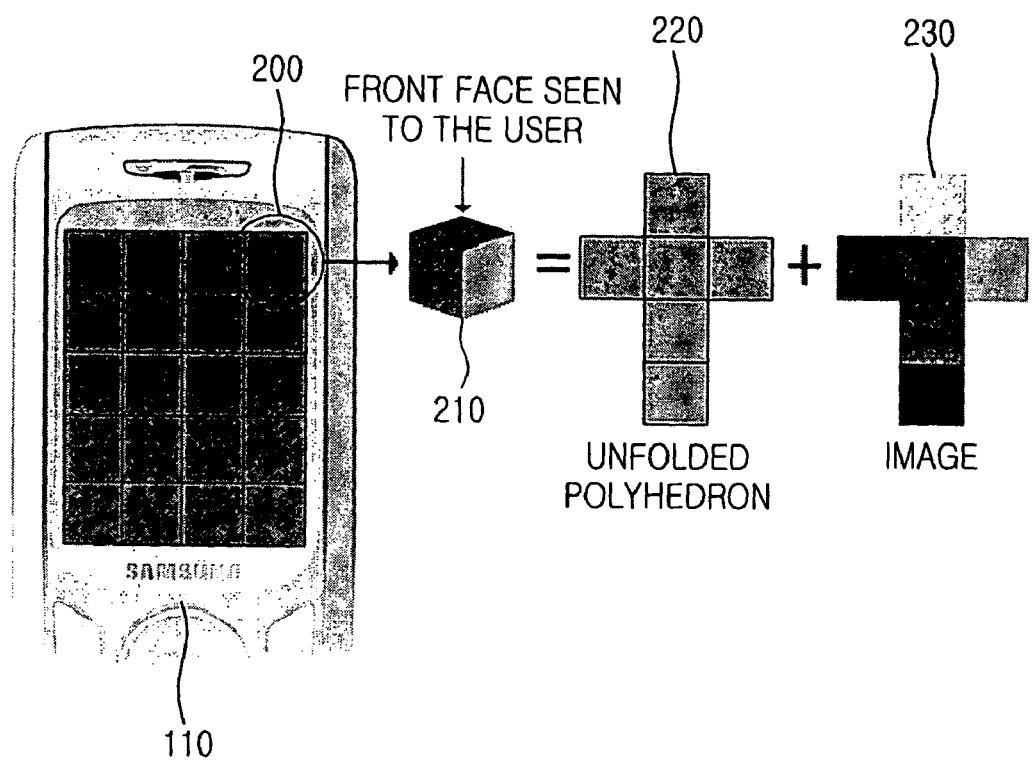
FIG. 2 illustrates the construction of a display unit of a mobile terminal according to the present invention.

The changes of an image according to the degree of tilt of the mobile terminal will be explained with reference to FIG. 2. In FIG. 2, the display unit of the mobile terminal appears to be composed of a plurality of squares. Actually, the display unit is filled with a plurality of polyhedrons, i.e. regular hexahedrons, each of which is bounded by six squares. Only the squares which are the front faces of the regular hexahedrons are seen on the display unit 110. As illustrated in FIG. 2, each square 200 of the display unit 110 is one of the six faces of a regular hexahedron 210. When the hexahedron 210 is unfolded, it becomes a single plane figure 220 made of six squares. The six squares are mapped with different images 230. For convenience of explanation, the different images mapped on the six squares will be illustrated using different colors.

It is assumed that the red faces of the regular hexahedrons are seen by the eyes of the user while the mobile terminal is in an upright direction and sets a GUI displayed in that direction. The red faces of the plurality of hexahedrons form a single image. If the image is a photograph, it can be divided into pieces corresponding to the number of hexahedrons. Each face of a hexahedron is mapped with a different piece of the image.

When the user tilts the mobile terminal in a specific direction, the regular hexahedrons move three-dimensionally according to the tilt angle and direction detected by the geomagnetic sensor. Thus, the mobile terminal provides dynamic changes of an image with the movement of the regular hexahedrons of the display unit without any separate key input.

Figure 3:
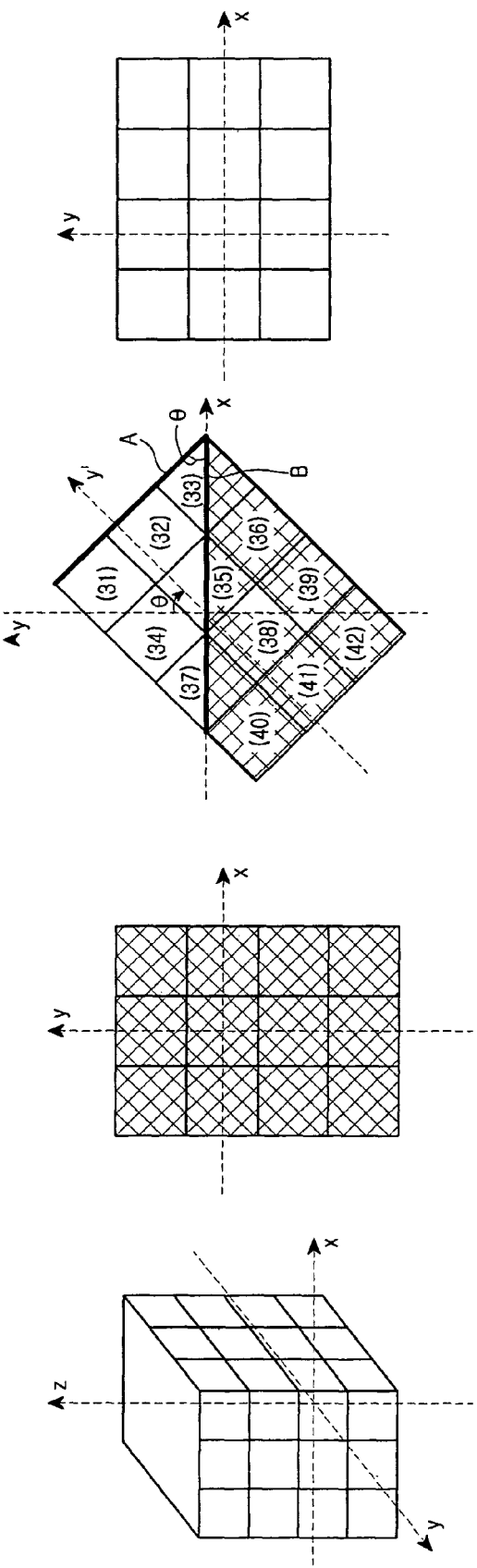
FIGS. 3A-3D illustrate views for explaining a polyhedron turning mechanism according to the present invention.

Hereinafter, the mechanism of turning the polyhedrons (regular hexahedrons) and changing an image according to the present invention will be explained using the concept of a water bucket as illustrated in FIG. 3. FIGS. 3A through 3D are views explaining the polyhedron turning mechanism according to the present invention.

FIG. 3A is a three-dimensional view of a hexahedron-shaped bucket standing in an upright direction, which represents the display unit with regular hexahedrons in an upright direction. The bucket is full of water and has an open top so that the water can flow out when tilted.

It is assumed that the bucket (display unit) is tilted only on a reference axis. Thus, the three-dimensional bucket can be simplified into a two-dimensional figure. Although the image changing mechanism according to the present invention will be explained using the two-dimensional figure, it is obvious to those skilled in the art that the mechanism can be applied to a three-dimensional one.

The three-dimensional view of the bucket in FIG. 3A can be simplified into a two-dimensional one in FIG. 3B. FIG. 3B illustrates the bucket full of water standing upright. The checked area represents the height of water in the bucket.

FIG. 3C illustrates the bucket in FIG. 3B tilted at a specific angle on the reference axis. When the bucket is tilted, the water flows out of the bucket in an amount corresponding to the tilt angle. In FIG. 3C, the amount of water remaining in the bucket is checked. The unchecked area represents an area in which polyhedrons of the display unit turn to change the image. Specifically, the water leaking area (i.e. polyhedron turning area) in FIG. 3C can be obtained using an angle θ between the reference axis y and the vertical axis y' of the tilted bucket, i.e. an angle θ between the top plane A of the bucket and the surface of water B (axis x).

The control unit 100 has information on the basic figure of polyhedrons in the display unit. When the display unit is tilted, the control unit 100 can determine which polyhedrons are to be included in the polyhedron turning area, based on a central vertex and a tilt angle of the display unit. The central vertex is the left vertex of the top plane of the display unit. The tilt angle is the angle θ. The control unit 100 applies the central vertex and tilt angle data to the information on the basic figure of polyhedrons and determines the polyhedrons included in the polyhedron turning area.

In addition, the control unit 100 sets a critical rate for determining whether a polyhedron partially included in the polyhedron turning area has to be turned. The control unit 100 turns polyhedrons if the rate of portions included in the polyhedron turning area exceeds the critical rate, thereby controlling the display of an image according to the tilt angle of the display unit.

Although the polyhedron turning mechanism has been explained using a two-dimensional figure with axes x and y for explanatory convenience, the mechanism can also be applied to a three-dimensional figure in every direction.

Each polygon in FIG. 3C is a square. When the bucket is tilted, the water leaking area (polyhedron turning area) is distinguished by the line B taken across a plurality of polyhedrons. These polyhedrons are turned only if the rate of portions included in the polyhedron turning area exceeds the critical rate. Typically, the critical rate can be, but not limited to, 50%. Thus, only the polyhedrons included in the polyhedron turning area completely or partially over the critical rate are turned. For example, a polyhedron numbered 37 in FIG. 3C is turned because the rate of a portion included in the polyhedron turning area exceeds 50%. On the other hand, a polyhedron numbered 38 in FIG. 3C is not turned because the rate of a portion included in the polyhedron turning area is much lower than 50%. Similarly, polyhedrons numbered 31, 32, 33, 34, 35 and 37 are turned, whereas polyhedrons numbered 36, 38, 39, 40, 41 and 42 are not turned.

FIG. 3D illustrates the bucket in FIG. 3B tilted over a critical angle, for example, laid down at a 90° angle. When the bucket is laid down, all the water in the bucket flows out.

Similarly, when the display unit is turned 90°, all polyhedrons are included in the polyhedron turning area and thus turned sequentially. After the turning of the polyhedrons, another face of each polyhedron (regular hexahedron) appears on the display unit.

Figure 4:
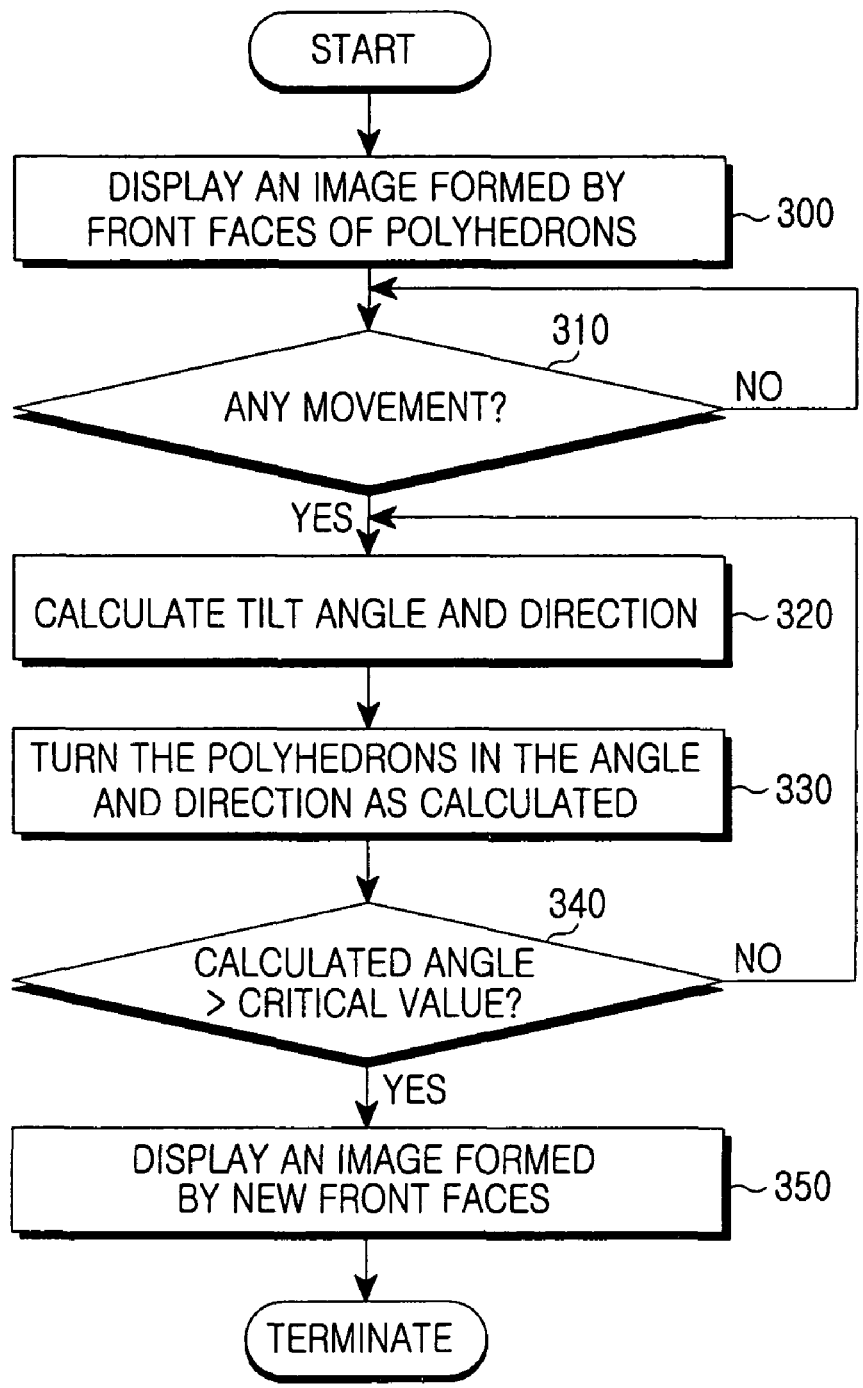
FIG. 4 is a flow chart showing a process for controlling the display of an image according to the degree of tilt of a mobile terminal according to the present invention.

Hereinafter, a process for controlling the display of an image according to the degree of tilt of the mobile terminal using the polyhedron turning mechanism will be explained in detail with reference to a flow chart in FIG. 4.

In step 300, the control unit 100 displays a single image formed by the front faces of a plurality of polyhedrons on the display unit. In step 310, the control unit 100 receives a signal from the sensor unit 130 and detects a movement of the mobile terminal. When any movement is detected, the control unit 310 proceeds to step 320 in order to calculate a tilt angle and direction of the mobile terminal using information on the tilt degree provided from the sensor unit 130. Since the control unit 100 has information on the basic figure of polyhedrons, it determines which polyhedrons are included in the polyhedron turning area based on the calculated angle and direction in order to turn the polyhedrons according to the calculated angle and direction. In step 330, the control unit 100 turns the polyhedrons included in the polyhedron turning area three-dimensionally in a direction and at an angle corresponding to the calculated direction and angle.

To prevent the excessively sensitive turning of the polyhedrons, it is possible to set the polyhedrons not to turn until or unless the mobile terminal is tilted at an angle exceeding 30 degrees. When the user tilts the mobile terminal at an angle not exceeding 30 degrees, the front faces of the polyhedrons in the display unit turn slightly but return to their original positions. Thus, two other faces of the polyhedrons (regular hexahedrons) slightly appear on the display unit but soon disappear with the initial front faces returning to their original positions.

In step 340, the control unit 100 determines whether the calculated angle of tilt exceeds a critical value. The critical value can be 90°. If the calculated angle is greater than the critical value, the control unit 100 will proceed to step 350 in order to control the display unit 110 to show other faces of the polyhedrons and thereby display a new image corresponding to the other faces. The polyhedrons are turned in a direction corresponding to the tilt direction of the mobile terminal so that new faces of the polyhedrons will appear as front faces on the display unit 110. Therefore, an image corresponding to the newly appearing faces is displayed on the display unit 110.

FIGS. 5A and 5B illustrate the display of a picture changing with the tilt of the mobile terminal according to a of the present invention.

More specifically, FIG. 5 shows a picture changing when the display unit is turned 90° counterclockwise. It is assumed that the six squares of each regular hexahedron are mapped with different colored images as illustrated in FIG. 2. The hexahedrons of the display unit are turned in a direction corresponding to the turn of the display unit. If the display unit initially in an upright direction is turned counterclockwise to provide a wider horizontal display mode, the hexahedrons of the display unit will turn sequentially across a face diagonal in a direction from "a" to "b". If the display unit is turned 90° counterclockwise as illustrated in FIG. 5, the red faces of the hexahedrons will all turn in a direction corresponding to the turn of the display unit so that the green faces of the hexahedrons can appear as new front faces on the display unit. If the display unit is turned in a clockwise direction, the red faces of the hexahedrons will turn in a corresponding direction so that the blue faces of the hexahedrons can appear as new front faces on the display unit (see FIG. 2).

The change of a picture with the swivel of the display unit will be explained in detail with reference to FIG. 6. FIG. 6A illustrates a general menu screen on the mobile terminal and the three-dimensional turning of the regular hexahedrons which display menu icon images.

As illustrated in FIG. 6A, it is assumed that the mobile terminal provides a menu screen with a tile-like background and that each menu icon corresponds to one tile. When the user turns the display unit of the mobile terminal, regular hexahedrons corresponding to each tile also turn as illustrated in FIG. 6B. To be specific, the hexahedrons turn individually in a direction 500, 510 or 520 corresponding to the turn of the display unit. The degree of turning of each hexahedron varies according to the location in the display unit. If the display unit is turned counterclockwise, hexahedrons 530 at the top right corner of the display unit will turn at a relatively greater angle than hexahedrons 540 in the middle of the display unit. The hexahedrons 540 will turn at a relatively greater angle than hexahedrons 550 at a lower part of the display unit. As illustrated in FIG. 6B, the hexahedrons 550 do not turn when the tilt angle of the display unit is not above the critical angle.

Figures 7A, 7B, 7C:
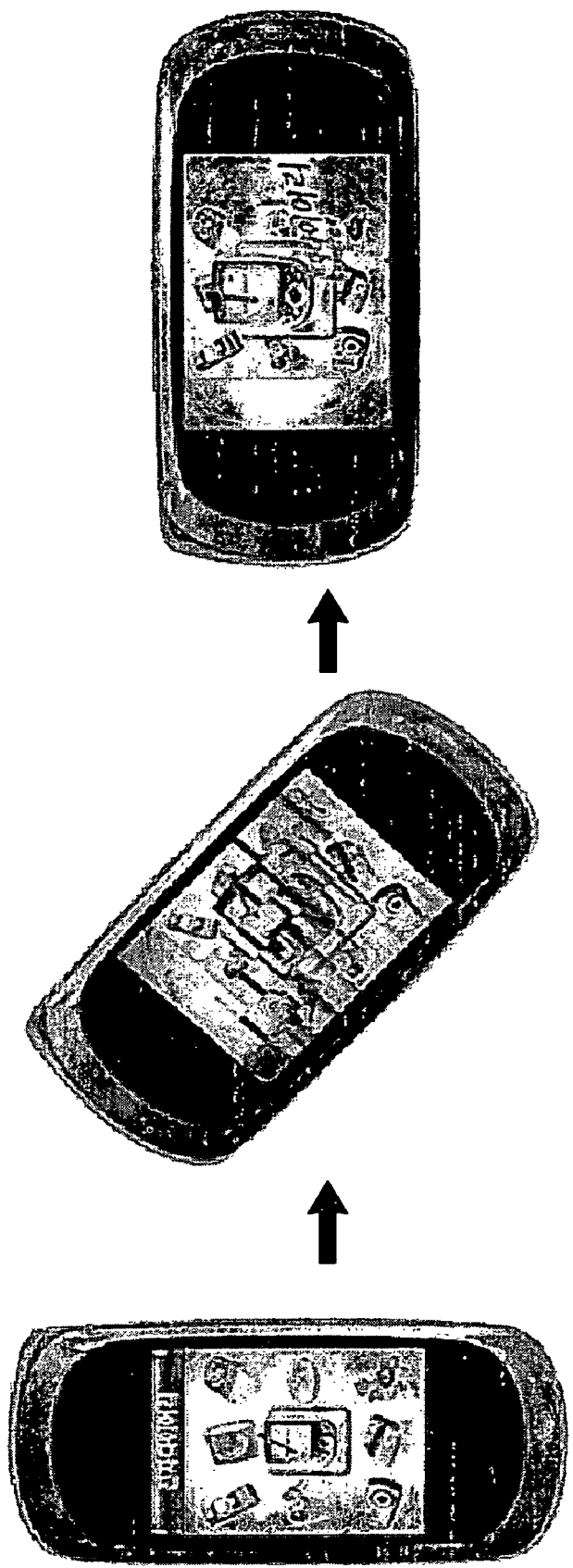
FIGS. 7A-7C illustrate the changes of an image with the swivel of a display unit according to the present invention.

As explained above, when the tilt angle of the display unit exceeds a critical value, polyhedrons included in the polyhedron turning area turn, thereby controlling the display of an image according to the degree of tilt of the display unit. FIG. 7A-7C illustrates changes of an image with the swivel of the display unit. Specifically, FIG. 7A illustrates an image displayed when the display unit is in an upright direction. When the user turns the display unit counterclockwise more than a certain angle, polyhedrons turn sequentially in the same direction, like dominoes, as illustrated in FIG. 7B. When the user stops turning of the display unit at 90°, new faces of the polyhedrons appear as front faces on the display unit, thereby displaying a newly established image as illustrated in FIG. 7C. Preferably, the initial image is newly established to have a size corresponding to the ratio of length to height of the display unit turned 90° to a horizontal mode.

Although FIGS. 5 to 7 illustrate the display of an image changing with the swivel of the display unit using different colors and menu icons, various display effects can be produced according to the selection by users, service providers or mobile terminal manufacturers. FIG. 7 illustrates dynamic changes of an image with the domino-like turning of the polyhedrons that form the menu image when the display unit is turned from an upright direction to a horizontal direction. According to another embodiment of the present invention, it is possible to implement a photo album function that displays a plurality of photographs using different faces of each polyhedron. For example, a photograph displayed in the upright direction of the mobile terminal can be changed to another photograph when the mobile terminal is tilted to the left or right at an angle exceeding a critical value. Since different photographs are displayed with dynamic interaction according to the tilt angle and direction of the mobile terminal, users may feel as if they are turning the pages of an album.

In accordance with the present invention, the user can see the pictures in an upright position, regardless of the direction in which the display unit is turned. When the display unit initially in an upright direction is turned sideways, the initial image is changed by the new front faces of the polyhedrons and adjusted to have a size corresponding to the ratio of length to height of the display unit turned sideways mode. Since the size of the image is automatically adjusted according to the turning of the display unit, the user may take photographs in the horizontal mode of the display unit and simply turn the display unit in the upright direction to edit the photographs, without the need to adjusting the size of the displayed photographs. In other words, every image displayed is automatically adjusted or regenerated to have a size corresponding to the ratio of length to height of the display unit in the horizontal or vertical mode, thereby providing a convenient user interface.

In accordance with the present invention, the polyhedrons in the display unit move three-dimensionally with the turning of the display unit, thereby changing a displayed image dynamically without any separate key input.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A mobile terminal capable of controlling display of a picture according to a degree of tilt thereof, the mobile terminal comprising:
    a display unit for displaying an image formed by a collection of front faces of polyhedrons which turn three-dimensionally according to a direction and an angle of tilt of the mobile terminal;
    a sensor unit for detecting a movement of the mobile terminal and calculating the tilt direction and tilt angle of the mobile terminal;
    and a control unit for displaying dynamic changes of the front faces of the polyhedrons according to the tilt direction and tilt angle data provided from the sensor and for turning the polyhedrons further in the tilt direction when the tilt angle exceeds a critical value, thereby displaying an image formed by new front faces of the polyhedrons.

2. The mobile terminal according to claim 1, wherein said control unit determines a polyhedron turning area in which polyhedrons are to be turned in a direction and at an angle corresponding to the tilt direction and tilt angle of the mobile terminal when the tilt angle exceeds the critical value, and turns the polyhedrons included in the polyhedron turning area so that new faces of the polyhedrons will appear on the display unit.

3. The mobile terminal according to claim 1, wherein said control unit turns the polyhedrons in a direction and at an angle corresponding to the tilt direction and tilt angle of the mobile terminal and returns the polyhedrons to their original positions when the tilt angle does not exceed the critical value.

4. The mobile terminal according to claim 1, wherein said sensor unit is a geomagnetic sensor.

5. The mobile terminal according to claim 1, wherein said control unit adjusts the image formed by new front faces of the polyhedrons to have a size corresponding to a ratio of length to height of the display unit.

6. The mobile terminal according to claim 1, wherein said polyhedrons are regular hexahedrons, each having six faces mapped with different images.

7. The mobile terminal according to claim 1, wherein said image is a photograph divided into pieces corresponding to a number of polyhedrons, with each face of the polyhedrons mapped with a different piece of the photograph image.

8. The mobile terminal according to claim 1, wherein said control unit displays a plurality of photographs using different faces of each polyhedron by changing a photograph displayed in an upright direction of the mobile terminal to another when the mobile terminal is tilted in any direction at an angle exceeding the critical value.

9. The mobile terminal according to claim 1, further comprising a memory for storing a three-dimensional (3D) engine.

10. A method for controlling display of a picture according to a degree of tilt of a mobile terminal, the method comprising the steps of:
   displaying an image formed by a collection of front faces of polyhedrons;
   detecting a movement of the mobile terminal during the display of the image;
   calculating a tilt direction and tilt angle of the mobile terminal when any movement is detected;
   turning the front faces of the polyhedrons three-dimensionally in a direction and at an angle corresponding to the calculated tilt direction and tilt angle; and
   displaying an image formed by new front faces of the polyhedrons.

11. The method according to claim 10, wherein said tilt direction and angle is calculated using a geomagnetic sensor.

12. The method according to claim 10, wherein said step of turning the front faces of the polyhedrons three-dimensionally and displaying an image formed by new front faces includes:
   determining whether the tilt angle exceeds a critical value;
   determining a polyhedron turning area in which polyhedrons are to be turned when the tilt angle exceeds the critical value; and
   turning the polyhedrons included in the polyhedron turning area in the tilt direction and displaying an image formed by new front faces of the polyhedrons.

13. The method according to claim 12, further comprising:
   turning the polyhedrons included in the polyhedron turning area in a direction and at an angle corresponding to the tilt direction and tilt angle of the mobile terminal and returns the polyhedrons to their original positions when the tilt angle does not exceed the critical value.

14. The method according to claim 12, wherein said step of displaying an image formed by new front faces of the polyhedrons includes:
   adjusting the image to have a size corresponding to a ratio of length to height of the display unit.

15. The method according to claim 10, further comprising:
   displaying a different image whenever the mobile terminal is tilted in any direction at an angle exceeding a critical value.

* * * * *